US012163843B2

(12) United States Patent
Aksoy et al.

(10) Patent No.: US 12,163,843 B2
(45) Date of Patent: Dec. 10, 2024

(54) METHODS, PROGRAM PRODUCTS, AND SYSTEMS FOR IMPROVED OPERATION OF RADIOMETERS BASED ON CALCULATED CALIBRATION UNCERTAINTIES

(71) Applicant: The Research Foundation for the State University of New York, Albany, NY (US)

(72) Inventors: Mustafa Aksoy, Albany, NY (US); John Bradburn, Menands, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 488 days.

(21) Appl. No.: 17/526,903

(22) Filed: Nov. 15, 2021

(65) Prior Publication Data

US 2023/0341269 A1 Oct. 26, 2023

Related U.S. Application Data

(60) Provisional application No. 63/113,532, filed on Nov. 13, 2020.

(51) Int. Cl.
*G01J 5/10* (2006.01)
*G01J 5/80* (2022.01)

(52) U.S. Cl.
CPC .. *G01J 5/10* (2013.01); *G01J 5/80* (2022.01)

(58) Field of Classification Search
CPC ..................................... G01J 5/10; G01J 5/80
See application file for complete search history.

(56) References Cited

U.S. PATENT DOCUMENTS

| | | | | |
|---|---|---|---|---|
| 8,067,738 | B1 * | 11/2011 | Heath | G01J 3/36 250/338.1 |
| 2011/0218734 | A1 * | 9/2011 | Solheim | G01W 1/10 702/3 |
| 2011/0299640 | A1 * | 12/2011 | Racette | H04L 27/08 375/345 |
| 2012/0035900 | A1 * | 2/2012 | Ingram | G01S 7/411 702/181 |
| 2021/0150183 | A1 * | 5/2021 | Bader | G06V 20/176 |
| 2021/0231498 | A1 * | 7/2021 | Tufillaro | G01J 3/10 |
| 2021/0383573 | A1 * | 12/2021 | Holt | G06T 7/70 |
| 2022/0323146 | A1 * | 10/2022 | Panescu | A61B 5/6843 |

* cited by examiner

*Primary Examiner* — Hugh Maupin
(74) *Attorney, Agent, or Firm* — Lance D. Reich; Peter Fallon

(57) ABSTRACT

Operations of radiometers may be improved by calculating calibration uncertainties for the radiometer. Initially, operational characteristics for the radiometer, and/or historical calibration parameters for a plurality of previously performed calibration processes using the radiometer may be obtained. Additionally, a calibration uncertainty for the radiometer based on the obtained operational characteristics for the radiometer and the obtained historical calibration parameters may be calculated, and desired, calibration parameters for the radiometer may be identified. The identified desired, calibration parameters may be based on the calculated, calibration uncertainty.

17 Claims, 7 Drawing Sheets

OBTAIN OPERATIONAL CHARACTERISTICS FOR RADIOMETER AND/OR HISTORICAL CALIBRATION PARAMETERS — P1

CALCULATE CALIBRATION UNCERTAINTY FOR RADIOMETER — P2

IDENTIFY DESIRED, CALIBRATION PARAMETERS FOR RADIOMETER — P3

ADJUST FUTURE CALIBRATION PROCESSES FOR RADIOMETER USING IDENTIFIED, DESIRED CALIBRATION PARAMETERS — P4

METHODS, PROGRAM PRODUCTS, AND SYSTEMS FOR IMPROVED OPERATION OF RADIOMETERS BASED ON CALCULATED CALIBRATION UNCERTAINTIES

CROSS-REFERENCE TO RELATED APPLICATIONS

This application claims priority to U.S. provisional application No. 63/113,532 filed on Nov. 13, 2020, the content of which is hereby incorporated by reference into the present application.

GOVERNMENT RIGHTS

This invention was made with government support under Grant No. 80NSSC18K0518 awarded by the National Aeronautics and Space Administration (NASA). The government has certain rights in the invention.

BACKGROUND

The disclosure relates generally to radiometers, and more particularly, to methods, program products, and systems for improving the operation of radiometers based on calculated calibration uncertainties.

Radiometers are typically used to measure geophysical parameters to examine variations in the earth and planetary systems. During conventional processes, the measurement of these geophysical parameters may be obtained over large temporal and/or spatial scales. However, some conventional radiometers and radiometer measurement-processes required additional procedures to ensure accuracy and/or sensitivity to the measurements taken by the radiometer. For example, conventional microwave radiometers typically require additional procedures for ensuring high-resolution contrasts in various measured, geophysical parameters from the rest of the noise measured or detected by the microwave radiometer. In order to maintain accurate measurements, microwave radiometers are usually calibrated prior to measuring geophysical parameters.

Conventional calibration procedures performed by radiometers prior to measuring geophysical parameters assume that some of the values are constant and/or unchanged. For example, conventional calibration procedures include determining a gain for the measuring radiometer, and assume the gain is fixed/constant, and therefore correct upon performing a single calibration procedure. As such, the measured geophysical parameters, which is a function of the gain, is assumed to be accurate as well. However, the gain for the radiometer is not constant, but rather fluctuates and/or varies based on a variety of calibration parameters (e.g., observation time of calibration target, bandwidth, number of calibration targets, etc.). Because of this, conventional processes for calibrating radiometers may be fairly inaccurate based on the fluctuations of the radiometer gain.

BRIEF DESCRIPTION

A first aspect of the disclosure provides a method for improving an operation of a radiometer. The method includes: obtaining: operational characteristics for the radiometer, and historical calibration parameters for a plurality of previously performed calibration processes using the radiometer; calculating a calibration uncertainty for the radiometer based on the obtained operational characteristics for the radiometer and the obtained historical calibration parameters; and identifying desired, calibration parameters for the radiometer based on the calculated, calibration uncertainty.

A second aspect of the disclosure provides a computer program product including program code stored on a non-transitory computer readable storage medium, which when executed by at least one computing device, causes the at least one computing device to improve an operation of a radiometer by performing processes including: obtaining: operational characteristics for the radiometer, and historical calibration parameters for a plurality of previously performed calibration processes using the radiometer; calculating a calibration uncertainty for the radiometer based on the obtained operational characteristics for the radiometer and the obtained historical calibration parameters; and identifying desired, calibration parameters for the radiometer based on the calculated, calibration uncertainty.

A third aspect of the disclosure provides a system including: a radiometer; and at least one computing device operably coupled to the radiometer, the at least one computing device configured to improve an operation of the radiometer by performing processes including: obtaining: operational characteristics for the radiometer, and historical calibration parameters for a plurality of previously performed calibration processes using the radiometer; calculating a calibration uncertainty for the radiometer based on the obtained operational characteristics for the radiometer and the obtained historical calibration parameters; and identifying desired, calibration parameters for the radiometer based on the calculated, calibration uncertainty.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As discussed herein, the disclosure relates generally to radiometers, and more particularly, to methods, program products, and systems for improving the operation of radiometers based on calculated calibration uncertainties.

Various aspects of the current disclosure may also be incorporated in and discussed in certain detail in previous publications. For example, M. Aksoy, H. Rajabi, P. E. Racette and J. Bradburn, "Analysis of Nonstationary Radiometer Gain Using Ensemble Detection", IEEE Journal of Selected Topics in Applied Earth Observations and Remote Sensing, vol. 13, pp. 2807-2818, 2020. The content of the publication, as well as the provisional application is hereby incorporated by reference into the present application.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
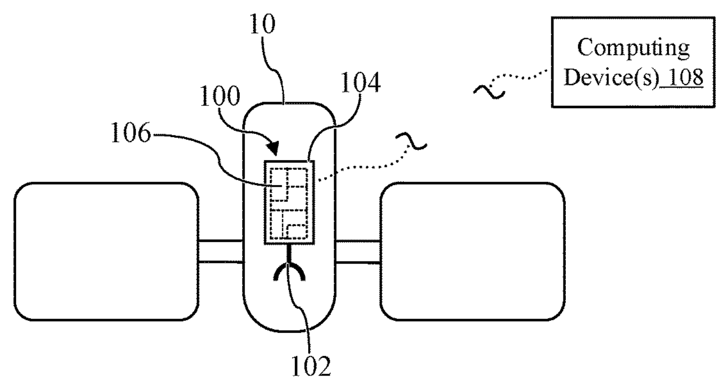
FIG. 1 shows a front view of a satellite including a radiometer, according to embodiments of the disclosure.

Turning to FIG. 1, a front view of a satellite including a radiometer 100 is shown. More specifically, satellite 10 may including a radiometer 100 positioned thereon and/or included therein, such that radiometer 100 may move and/or travel with satellite 10 along a desired travel path (see, FIG. 2). Satellite 10 may be formed as any suitable satellite, object, and/or system that may move or fly along a desired, orbital travel path around a predetermined astronomical body 12 (e.g., Earth) (hereafter, "body 12") (see, FIG. 2). As such, satellite 10 may also include any suitable flight and/or propulsion systems for moving satellite 10, and the apparatuses/devices included thereon (e.g., radiometer 100), (orbitally) around body 12.

Figure 2:
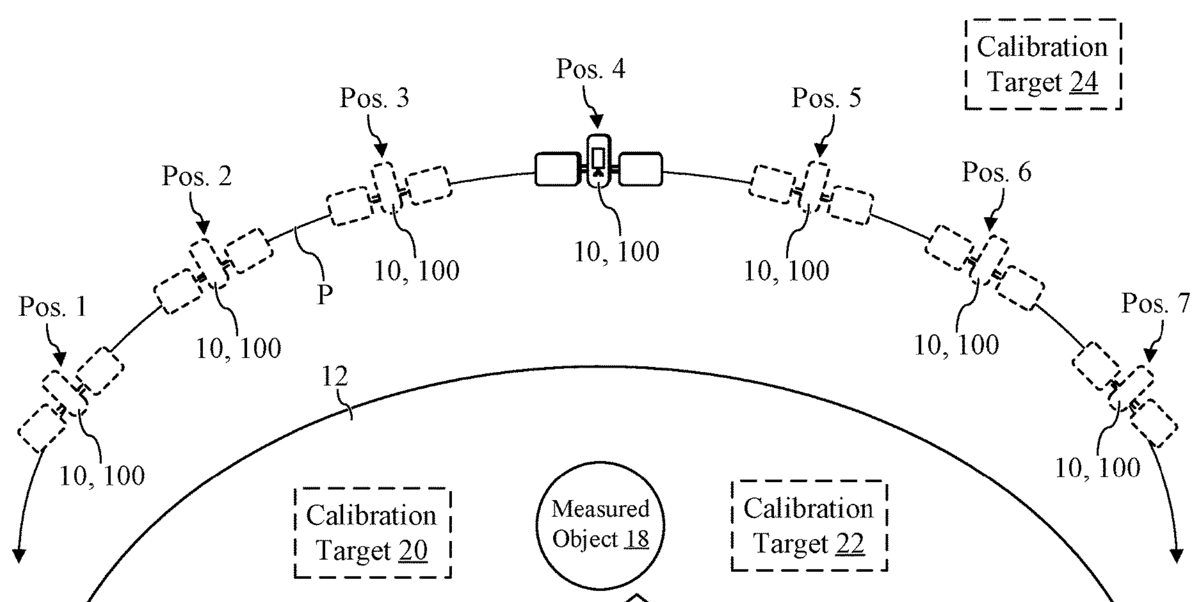
FIG. 2 shows a front view of measured object positioned at a predetermined location, a plurality of calibration targets, and the satellite of FIG. 1 taking measurements at various positions, according to embodiments of the disclosure.

Radiometer 100 included on satellite 10 may be formed as any suitable radiometer device and/or system that may be configured to detect an emitted energy (E) from various targets and/or objects included or positioned on and/or adjacent body 12, as discussed herein (e.g., FIG. 2). Additionally, and as discussed herein, the detected energy (E) emitted from various targets/objects may be determined by converting an energy captured by antenna(s) of radiometer 100, perceived by radiometer 100/control systems/computing device(s) as a determined voltage(s), into energy using calibration processes and/or measurements. In a non-limiting example radiometer 100 may be formed as a microwave radiometer. In other non-limiting examples, radiometer 100 may be formed as a millimeter wave radiometer or an infrared radiometer. As shown in FIG. 1, radiometer 100 may include an external antenna 102. External antenna 102 may be positioned adjacent satellite 10 and/or may extend from a body 104 of radiometer 100. In non-limiting examples, antenna 102 may be configured to move in a desired direction when taking a measurement of a calibration target and/or measured object to detect, determine, and/or sense the energy (E) emitted by the calibration target/measured object.

Additionally, and as shown in FIG. 1, Radiometer 100 may include internal components and/or circuitry 106 (hereafter, "internal components 106") that may aid in detection, determination and/or sensing of energy (E) emitted by the calibration target/measured object, as discussed herein. For example, internal components 106 may include a plurality of sensors to detect and/or sense the temperature of antenna 102, and/or ambient temperatures/atmospheric characteristics for the area surrounding satellite 10 including radiometer 100. Additionally, internal components 106 may include devices, systems, and/or circuitry that may enable radiometer 100 to adjust the position of antenna 102 when detecting energy (E) emitted by the calibration target/measured object. Furthermore in a non-limiting example, internal components 106 may include suitable communication devices, systems, and/or circuitry. As discussed herein, communication devices may allow an operator to interact with radiometer 100 and adjust operational characteristics of radiometer 100 during the measuring and calibration processes.

In a non-limiting example, communication devices of internal components 106 for radiometer 100 may be in electronic communication, connected to, and/or operably coupled to at least one computing device 108. Computing device(s) 108 may control and/or allow an operator to control various portions of radiometer 100 (e.g., antenna 102) to perform measuring and calibration processes, as discussed herein. Additionally, and as discussed herein, computing device(s) 108 may receive and transform data and/or information from radiometer 100 to improve the operation of radiometer 100 when performing the measuring and calibration processes. Computing device(s) 108 may be a stand-alone device, or alternatively may be a portion and/or included in a larger computing device (e.g., internal components 106) of radiometer 100. For example, and as shown in FIG. 1, computing device(s) 108 may be separate from radiometer 100. Alternatively, computing device(s) 108 may be part of the overall computing system that is used in the operation of radiometer 100. As such, computing device(s) 108 may be formed as any device and/or computing system/network that may be configured to perform the processes discussed herein to operate radiometer 100 and/or transform data received by radiometer 100. As discussed herein, computing device 108 may be configured to control the various portions of radiometer to perform measuring and calibration processes. In non-limiting examples, computing device(s) 108 may be hard-wired and/or wirelessly connected to and/or in communication with internal components 106, and/or other components via any suitable electronic and/or mechanical communication component or technique.

As discussed herein, radiometer 100 may be configured to detect, determine, and/or sense the energy (E) emitted by a measured object (see, FIG. 2). Radiometer 100 may perform measurement processes on measured object 18 to detect and/or determine a (microwave) energy (E) emitted from measured object 18. However, radiometer may not measure the energy emitted from measured object directly. Rather, emitted energy (E) from measured object 18 of body 12 may be a function of a voltage (V) associated with measured object 18, for which radiometer 100 may detect or measure through internal components 106, and radiometer gain (G). Radiometer gain (G) may also not be directly measured or obtained by radiometer 100, but rather may be obtained, calculated, and/or estimated by performing calibration processes using radiometer 100. In a non-limiting example, radiometer 100 may measure, detect, sense, and/or perceive the voltage (V) of a plurality of predetermined, calibration targets (CT). The predetermined, calibration targets (CT) may have a known emitted energy (E) that may be previously measured, detected, and/or calculated based on additional information or data relating to the calibration targets (CT). As such, and based on the known emitted energy (E) for each calibration target (CT) and the perceived voltage (V) for each calibration target (CT), a radiometer gain (G) may be obtained, calculated, and/or estimated based on the calibration processes performed by radiometer 100.

Turning to FIG. 2, and with continued reference to FIG. 1, processes for improving the operation of radiometer 100 may now be discussed. As discussed herein, and as discussed in each reference incorporated herein by reference, operational characteristics of radiometer 100 and/or historical calibration parameters (e.g., radiometer gains (G)) for previously performed calibration processes using radiometer 100 may be utilized to calculate a calibration uncertainty for radiometer 100. In turn, the calculated calibration uncertainty for radiometer 100 may be utilized to identify desired, calibration parameters for radiometer 100, which may ultimately improve the operation of radiometer 100 by increasing the accuracy of the detected/determined energy (E) emitted by the measured object. It is understood that similarly numbered and/or named components may function in a substantially similar fashion. Redundant explanation of these components has been omitted for clarity.

A measured object 18 may be observed, measured, and/or examined by radiometer 100 to determine the (microwave) energy (E) that measured object 18 may emit. In the non-limiting example shown in FIG. 2, measured object 18 may be a predetermined feature, landmark, and/or geographical element positioned on and/or within body 12. As discussed herein however, radiometer 100 may not directly observe, detect, and/or calculate the energy (E) emitted from measured object 18, without first determining the radiometer gain (G). Rather, calibration processes may be performed by radiometer 100 to determine radiometer gain(s) (G), which may be utilized to measure the emitted energy (E) of measured object 18.

As shown in FIG. 2, satellite 10 including radiometer 100 may orbit body 12 along a path (P) while performing the measuring processes on measured object 18. Additionally, satellite 10 including radiometer 100 may also performing calibration processes while orbiting body 12 along path (P). More specifically, and prior to performing the measuring processes on measure object 18, radiometer 100 may perform a plurality of calibration processes using a plurality of calibration targets (CT) 20, 22, 24. In the non-limiting example shown in FIG. 2, a first calibration target 20 and a second calibration target 22 may be included in or on body 12, while a third calibration target 24 may be located outside of or independent from body 12. Calibration targets (CT) 20, 22, 24 may all have known or predetermined energy emissions (E) prior to performing the calibration process using radiometer 100, and therefore may be utilized to model the radiometer gain (G) for radiometer 100 used to detect the emitted energy (E) from measured object 18.

In a non-limiting example, radiometer 100 may perform a "hot-cold" calibration process to determine, calculate, model, and/or estimate a radiometer gain (G). In this example, radiometer 100 may utilize a first calibration target 20 and a third calibration target 24 to perform the "hot-cold" calibration process. First calibration target 20 and second calibration target 22 may be formed as distinct bodies of water (e.g., ocean) on body 12, while third calibration target 24 may be "cold space," or a predefined area in cislunar space (e.g., beyond earth's atmosphere). Although discussed herein as using first calibration target 20 and third calibration target 24, it is understood that the calibration process performed by radiometer may include any number of calibration targets, so long as more than one is used during the calibration process.

In the non-limiting, a plurality of calibration processes may be performed at various locations or positions (hereafter, "positions") along the travel path (P). As shown in FIG. 2, for example, calibration processes may be performed at seven (7) distinct positions 1-7 (Pos. 1, Pos. 2, Pos. 3, etc.) of satellite 10 including radiometer 100 as satellite 10 moves along the travel path (P) orbiting body 12. At each position (Pos.), radiometer 100 may obtain, detect, sense, and/or perceive the voltage (V) for first calibration target 20 and third calibration target 24, respectively, while performing the calibration processes. That is, radiometer 100 may perceive two distinct voltages ($V_{CT20}$, $V_{CT24}$) corresponding to first calibration target 20 and third calibration target 24 at each position (Pos.) along travel path (P). Using the perceived voltages ($V_{CT20}$, $V_{CT24}$), and knowing the emitted energies ($E_{CT20}$, $E_{CT24}$) for first calibration target 20 and third calibration target 24, radiometer gain (G) for each position (Pos.) may be determined, calculated, estimated, and/or modelled.

Turning to FIGS. 3A-3G non-limiting examples of determined radiometer gains (G) are shown for each position (Pos.) of radiometer 100 as it travels along path (P) and performs the calibration processes. That is, FIGS. 3A-3G may depict a graph including the perceived voltages ($V_{CT20}$, $V_{CT24}$) and known emitted energies ($E_{CT20}$, $E_{CT24}$) for first calibration target 20 and third calibration target 24 at each predetermined position (Pos.) of radiometer 100 while performing the calibration processes. For example, FIG. 3A graphically depicts the voltages ($V_{CT20}$, $V_{CT24}$) measured by radiometer 100 at position 1 (Pos. 1) and the known emitted energies ($E_{CT24}$, $E_{CT24}$) for first calibration target 20 and third calibration target 24, respectively. Where the perceived voltage ($V_{CT20}$) for first calibration target 20 meets the known energy ($E_{CT20}$) for first calibration target 20 within the graph shown in FIG. 3A, a first, gain reference point ($G_{ref1}$) may be formed. Additionally, where the perceived voltage ($V_{CT24}$) for third calibration target 24 meets the known energy ($E_{CT24}$) for third calibration target 24 within the graph shown in FIG. 3A, a second, gain reference point ($G_{ref2}$) may be formed. Understanding and/or assuming the substantially linear relationship of the radiometer gain for radiometer 100, the calibration process performed at the first position (Pos. 1) using first calibration target 20 and third calibration target 24 may yield a first radiometer gain (G1) for radiometer 100.

The calibration process may be performed at each of the seven distinct positions (Pos.) along the travel path (P) of radiometer 100. As such, seven (7) distinct radiometer gains (G1, G2, G3, G4, G5, G6, G7) may obtained, measured, estimated, and/or calculated for radiometer 100. Each of the perceived voltages ($V_{CT20}$, $V_{CT24}$) may vary at each position, while the predefined energy ($E_{CT20}$, $E_{CT24}$) value may remain the same for first calibration target 20 and third calibration target 24. As such, the determined, estimated, and/or calculated radiometer gain (G1, G2, G3, G4, G5, G6, G7) for each of the seven (7) distinct positions (Pos.) along travel path (P) may vary from one another. The perceived voltages ($V_{CT20}$, $V_{CT24}$) may vary as a result of calibration parameters for the performed calibration process and/or operational characteristics of radiometer 100. The calibration parameters may include, but are not limited to, time intervals used when performing the calibration processes using radiometer 100, the specific calibration targets 20, 22, 24 used when performing the plurality of calibration processes using radiometer 100, a number of calibration targets 20, 22, 24 used when performing the plurality of calibration processes using radiometer 100, and/or a reference temperature for calibration target 20, 22, 24 used when performing the plurality of calibration processes using radiometer 100. Additionally, operational characteristics of radiometer 100 may include, but are not limited to, an age of radiometer 100, detected temperatures of antenna 102 of radiometer 100, detected internal component 106 temperatures of radiometer 100, time intervals for detecting energy (E) emitted by measured object 18, bandwidth of radiometer 100, or a position of radiometer 100 with respect to measured object 18. As discussed herein, calibration parameters and/or operational characteristics of radiometer 100 may be used to improve operation of radiometer 100 by aiding in the calculating of calibration uncertainty for radiometer 100, and identifying desired, calibration parameters.

Using the various radiometer gains (G1, G2, G3, G4, G5, G6, G7), as well as the operational characteristics for radiometer 100 and historical calibration parameters for the previously performed calibration processes to obtain radiometer gains (G1, G2, G3, G4, G5, G6, G7), the operation of radiometer 100 may be improved. More specifically, utilizing radiometer gains (G1, G2, G3, G4, G5, G6, G7), operational characteristics for radiometer 100 and historical calibration parameters, the measurement, detection, and/or sensing of the energy (E) of measured object 18 may be improved and/or may be achieved with increased accuracy and/or reduced uncertainty. In a non-limiting example, radiometer gains (G1, G2, G3, G4, G5, G6, G7), operational characteristics for radiometer 100 and historical calibration parameters may be used to calculate a calibration uncertainty for radiometer 100. In a non-limiting example, the calibration uncertainty for radiometer 100 may include and/or may correspond to a standard deviation of radiometer gain (G) and/or standard deviation of the product or calculated output of radiometer 100 (e.g., emitted energy (E) of measured object 18) as determined, measured, and/or estimated as discussed herein. The calculated, calibration uncertainty relating to each of the radiometer gains (G1, G2, G3, G4, G5, G6, G7) may identify those detected radiometer gains (G1, G2, G3, G4, G5, G6, G7) that have the most/least amount of uncertainty.

Figure 3A:
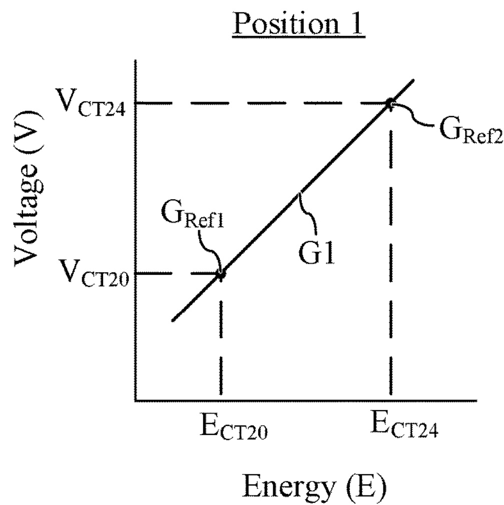
FIGS. 3A-3G show voltage-energy graphs representing the radiometer gain obtained during calibration processes, according to embodiments of the disclosure.
Figure 3B:
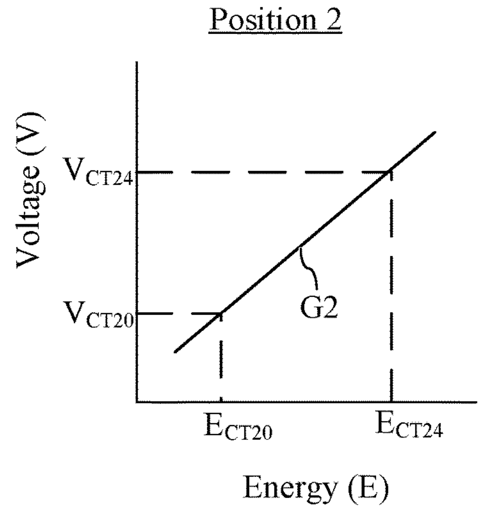
Figure 3C:
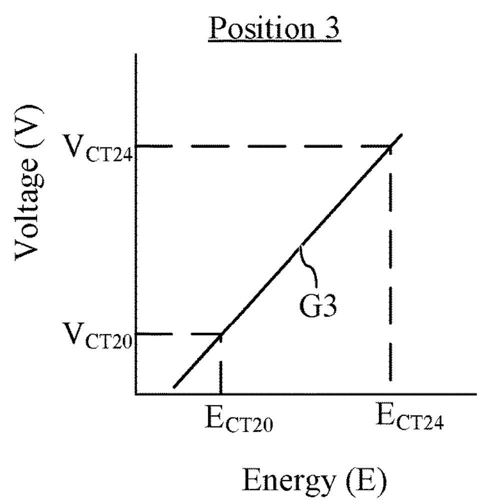
Figure 3D:
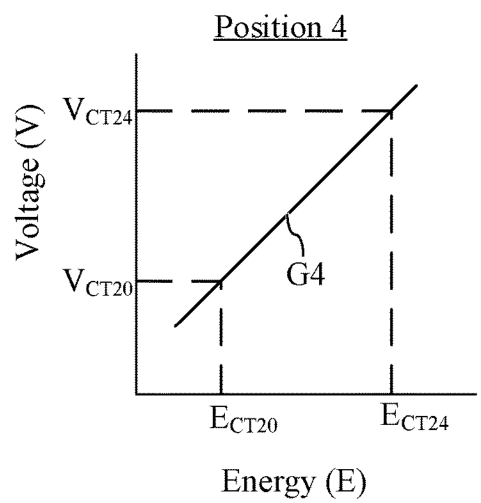
Figure 3E:
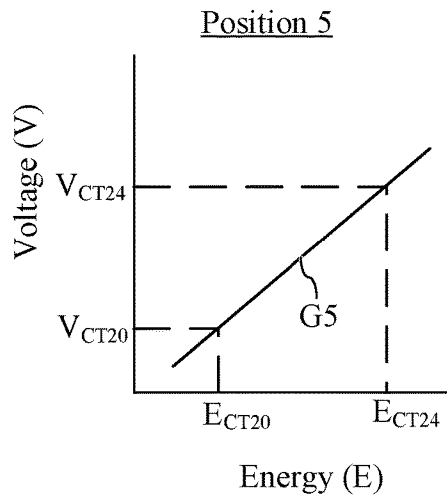
Figure 3F:
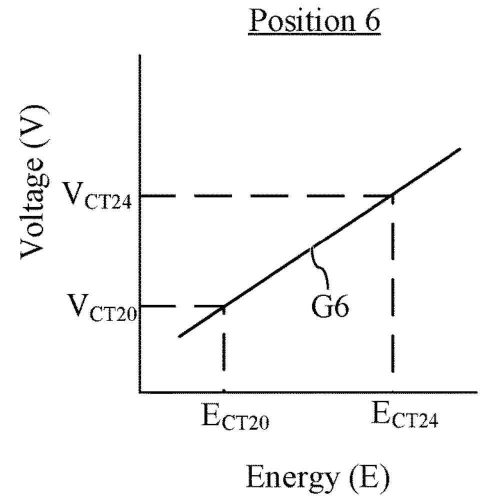
Figure 3G:
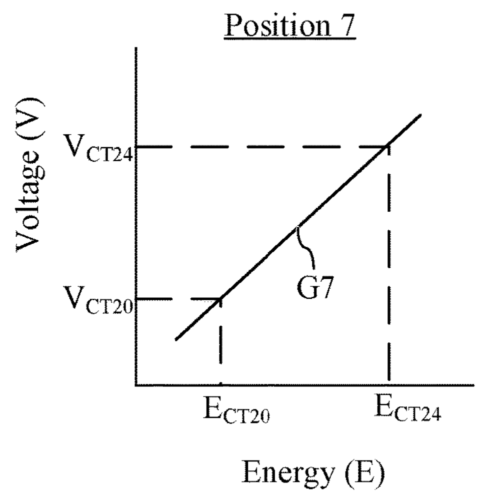
Figure 4:
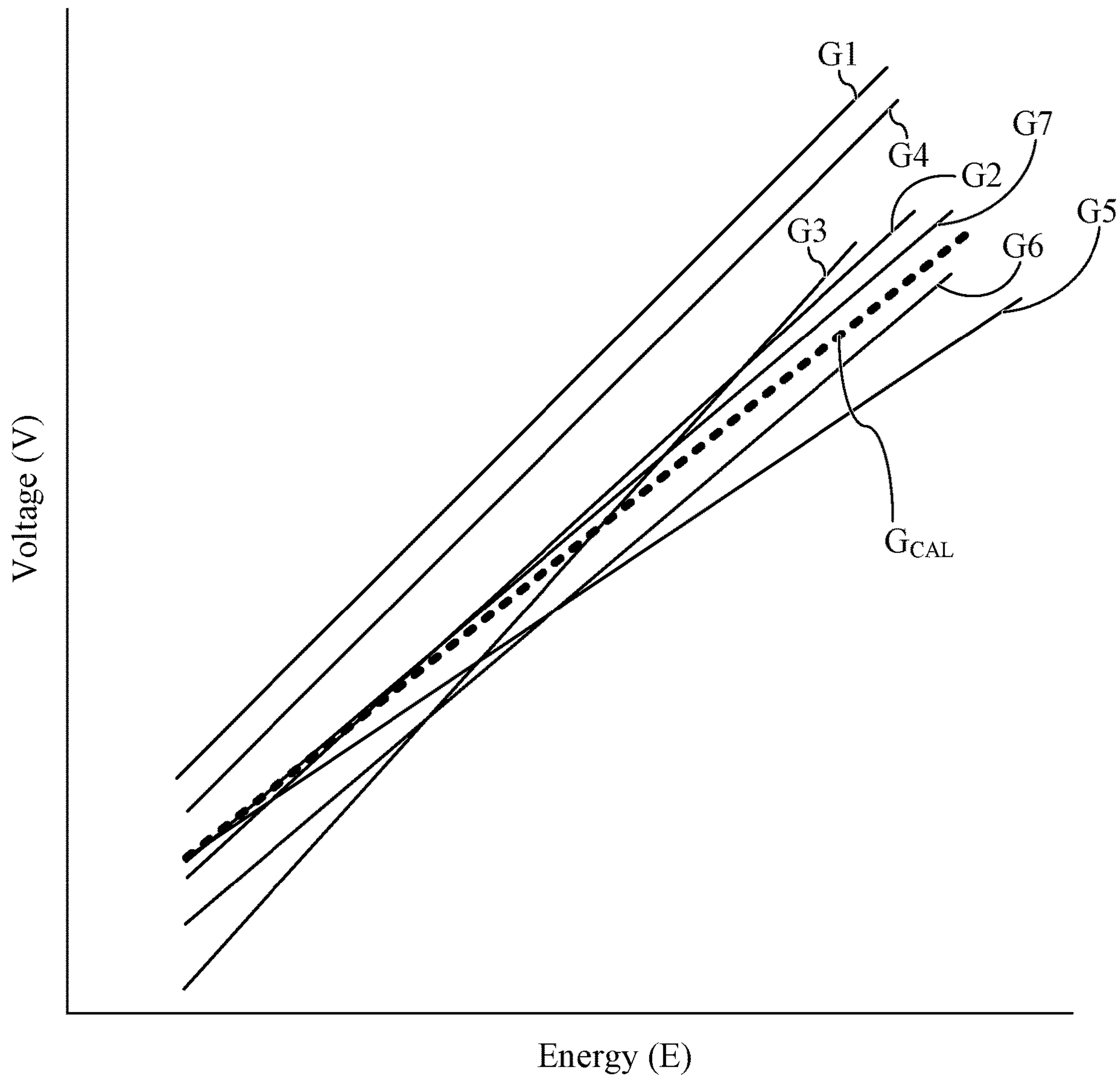
FIG. 4 shows a graph including the radiometer gains of FIGS. 3A-3G and a calculated radiometer gain, according to embodiments of the disclosure.

In a non-limiting example, the calculating of the calibration uncertainty may include analyzing a fluctuation in radiometer gains (G) determined during the performed calibration processes using radiometer 100. Turning to FIG. 4, and continuing the example above, each of the plurality of radiometer gains (G1, G2, G3, G4, G5, G6, G7) shown in FIGS. 3A-3G may be depicted on a single graph. As discussed herein, after obtaining operational characteristics of radiometer 100 (e.g., position of radiometer when performing calibration processes) and/or historical calibration parameters (e.g., radiometer gains, calibration targets 20, 24, number of calibration targets, etc.), the data or information may be analyzed, manipulated, and/or computed to not only generate radiometer gains (G1, G2, G3, G4, G5, G6, G7), but also calculate a calibration uncertainty. Based on radiometer gains (G1, G2, G3, G4, G5, G6, G7) shown in FIGS. 3A-3G, and by performing formulaic processes discussed within the publications and provisionals incorporated herein in their entirety, a calculated radiometer gain (GCAL) may be determined and/or defined, as shown in FIG. 4. Using calculated radiometer gain (GCAL), an uncertainty for each of the individual radiometer gain may be determined, calculated, and/or identified. For example, and looking at FIG. 4, an uncertainty for the radiometer gain (G1) associated with the first position (Pos. 1) may be calculated using calculated radiometer gain (GCAL) and/or formulaic relationships as discussed herein. In this example, the calculated uncertainty for radiometer gain (G1) may be greater than the remainder of the uncertainties for other radiometer gains. Additionally, the radiometer gain (G2) associated with the second position (Pos. 2) and the radiometer gain (G7) associated with the seventh position (Pos. 7) may have the lowest or least calculated uncertainty out of all the radiometer gains (G).

Knowing at least one radiometer gain (G) that has a minimized and/or reduced uncertainty (e.g., radiometer gains (G2, G7)), may in turn help to identify desired, calibration parameters for radiometer 100. That is, once calibration uncertainties are calculated, an operator and/or radiometer control device (e.g., computer device(s) 108) may identify desired, calibration parameters that may minimize uncertainty in radiometer's measurements. This in turn may increase the accuracy of the measurement taken to determine or detect the energy (E) emitted by measured object 18. Continuing the example, the calculated uncertainty for radiometer gains (G2, G7) of radiometer 100 may be the lowest calculated uncertainties. As such, it may be determined and/or identified that radiometer 100 may be taking measurements in the calibration processes under similar conditions and/or desired, calibration parameters as those similar to the calibration parameters when the voltages ($V_{CT20}$, $V_{CT24}$) were detected, measured, sensed, and/or perceived at the second position (Pos. 2) and the seventh position (Pos. 7). As such, the future operation of radiometer 100 may be adjusted such that radiometer 100 only performs calibration processes at the second position (Pos. 2) and the seventh position (Pos. 7). Using the determined radiometer gain (G2, G7) at these identified positions (Pos. 2, Pos. 7), under identified desired, calibration parameters (e.g., specific calibration targets, number of targets, etc.), may provide radiometer 100 with the most accurate measurement of the radiometer gain, that in turn may be used when measuring the energy (E) emitted by the measured object 18 while radiometer 100 is located in the fourth position (Pos. 4). In other non-limiting examples, radiometer 100 may measure energy (E) emitted by measured object 18 while radiometer 100 is in a plurality of distinct positions (e.g., Pos. 2, Pos. 7), or alternatively radiometer 100 may continuously measure energy (E) emitted by measured object 18 while radiometer 100 moves along travel path (P)—so long as radiometer 100 uses radiometer gains (G2, G7) obtained while performing calibration processes at the identified, desired positions (Pos. 2, Pos. 7).

Although FIG. 4 indicates that radiometer gains (G2, G7) include minimal uncertainty, in other non-limiting examples it may be determined during the calibration processes and subsequent calculating of calibration uncertainties that none of the determined radiometer gains (G) include a low or minimized uncertainty. In this non-limiting example, radiometer 100 may adjust its operations while performing the calibration processes. For example, where utilizing first calibration target 20 and third calibration target 24 does not yield a minimized calibration uncertainty for radiometer 100, radiometer 100 may perform additional calibration processes for detecting, determining, and/or calculating using second calibration target 22 instead. That is, radiometer 100 may use second calibration target 22 and third calibration target 24, in place of first calibration target 20 and third calibration target 24, when performing calibration processes to minimize the calculated calibration uncertainty for radiometer 100. In the example where second calibration target 22 and third calibration target 24 minimize the calculated, calibration uncertainty for radiometer 100, than the identified desired, calibration parameters for radiometer 100 may include identifying second calibration target 22, not first calibration target 20, as the preferred calibration target when performing calibration processes. This in turn may result in a more accurate radiometer gain for radiometer 100, which may be used to measure the energy (E) emitted by measured object 18, as discussed herein.

In non-limiting examples, the calculating of the uncertainty for radiometer 100 and identifying of the desired, calibration parameters for radiometer 100 may be achieved, performed, and/or completed by computing device(s) 108 (see, FIG. 1). In this non-limiting example, computing device(s) 108 may receive operational characteristics for radiometer 100 and historical calibration parameters relating to the calibration processes performed at each position (Pos.) along travel path (P), and may subsequently generate, calculate, and/or determined radiometer gains (G1, G2, G3, G4, G5, G6, G7). Using this obtained and determined information, computing device(s) 108 may then calculate the calibration uncertainty, and using the calculated calibration uncertainty, identify the desired, calibration parameters for radiometer 100, as discussed herein. Furthermore, computing device(s) 108 may also communication, operate, and/or instruct radiometer 100 to perform calibration processes using the identified desired, calibration parameters for radiometer 100 prior to measuring, detecting, and/or sensing the energy (E) emitted by measured object 18. In performing these processes, and as discussed herein, the measurement of energy emitted by measured object 18 may have increased accuracy and/or reduced uncertainty, thus improving the operation of radiometer 100.

Additionally, although discussed herein as measuring, detecting, sensing, and/or perceiving the voltage of both first calibration target 20 and third calibration target 24 at a single position (Pos.) along travel path (P) to determine radiometer gain (G), it is understood that any combination of calibration targets at various positions can be utilized to determined radiometer gain (G). That is, FIG. 3A shows a radiometer gain (G1) determined using the perceived voltages ($V_{CT20}$, $V_{CT24}$) for first calibration target 20 and third calibration target 24—both measured while radiometer 100 is located at first position (Pos. 1) along travel path (P). In other non-limiting examples, a radiometer gain (G) may be determined by perceiving the voltage ($V_{CT20}$) for the first calibration target 20 while radiometer 100 is located at first position (Pos. 1) along travel path (P), but also perceiving the voltage ($V_{CT24}$) for the third calibration target 24 while radiometer 100 is located in a position other than first position (Pos. 1) (e.g., Pos. 2, Pos. 3, Pos. 4, etc.). As such, although seven examples are shown in FIGS. 3A-4, it is understood that in the example where there are seven (7) possible positions to perform calibration processes, approximately 49 possible radiometer gains (G) may be determined, calculated, and/or sensed. As more radiometer gains (G) are analyzed, evaluated, and/or included in the calculation of the calibration uncertainty, the more accurate/less uncertainty may be included in the measured energy (E) emitted from measured object 18.

Figure 5:
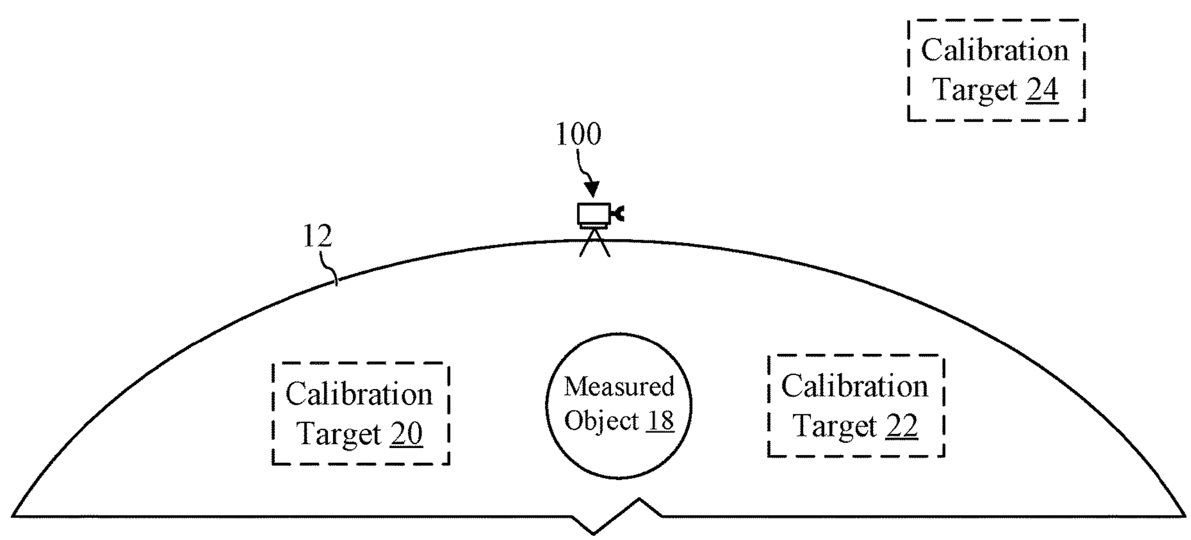
FIG. 5 shows a front view of measured object positioned at a predetermined location, a plurality of calibration targets, and a stationary radiometer positioned at a distinct location, according to additional embodiments of the disclosure.

FIG. 5 shows another non-limiting example of radiometer 100 measuring energy (E) emitted from measured object 18. It is understood that similarly numbered and/or named components may function in a substantially similar fashion. Redundant explanation of these components has been omitted for clarity.

In the non-limiting example, radiometer 100 may be stationary. That is, radiometer 100 may be positioned directly on body 12 and may not travel, move, and/or be transposed while operating. Although stationary, radiometer 100 may perform similar processes as discussed herein with respect to FIGS. 1-4. More specifically, radiometer 100 may perform calibration processes and may measure the energy (E) emitted from measured object 18 in a similar manner as discussed herein. Additionally, and to improve the accuracy and/or reduce the uncertainty in the measurement of measured object 18, radiometer 100 (and computing device(s) 108, not shown) may also obtain operational characteristics for radiometer 100 and/or historical calibration parameters, and may calculate calibration uncertainty for radiometer 100. Using the calculated calibration uncertainty, radiometer 100 shown in FIG. 5 may also identify desired, calibration parameters for radiometer 100 based on the calculated, calibration uncertainty.

The identified desired, calibration parameters for radiometer 100 that may be based on the calculated, calibration uncertainty may include and/or require adjusts to radiometer 100 when performing calibration processes and/or subsequent energy measurement processes. In non-limiting examples, and similar to the non-limiting example discussed herein with respect to FIGS. 1-4, identified desired, calibration parameters may indicate that in order to minimize uncertainty in radiometer 100, radiometer 100 may use second calibration target 22 and third calibration target 24, in place of first calibration target 20 and third calibration target 24, when performing calibration processes. That is, the uncertainty of radiometer 100 and/or radiometer gain (G) may be reduced, minimized, and/or substantially eliminated if second calibration target 22 is substituted for first calibration target 20 when radiometer 100 performs the future calibration processes to obtain radiometer gain (G). As discussed herein, this in turn may improve the accuracy and/or reduce the uncertainty of the measured energy (E) emitted from measured object 18.

Distinct from the non-limiting example discussed herein with respect to FIGS. 1-4, identified desired, calibration parameters may not include performing the calibration process at newly identified positions of radiometer 100. This is because in the non-limiting example of FIG. 5, radiometer 100 is stationary and may not be moved when performing the various processes as discussed herein. Rather, the identified desired, calibration parameter may relate to identified times or time intervals in which the calibration process may be performed. That is, when performing calibration processes to generate historical calibration parameters, and specifically radiometer gains (G) for radiometer 100 shown in FIG. 5, the determined, calculated, and/or sensed radiometer gains (G) may be based on distinct times or time intervals (not positions (Pos.) of radiometer) in which radiometer 100 detects, measures, senses, and/or perceives the voltages ($V_{CT20}$, $V_{CT22}$, $V_{CT24}$) for the calibration targets. As such, and to increase accuracy and/or decrease uncertainty, the identified desired, calibration parameters for radiometer 100 to perform calibration processes may include identifying new times or time intervals with the least amount of calibration uncertainty and/or may generate the least amount of radiometer gain (G) uncertainty.

Although each example is not discussed herein explicitly with reference to FIGS. 1-5, it is understood that any operational characteristic and/or calibration parameter may be adjusted based on the identified desired, calibration parameters to improve the operation of radiometer 100. Furthermore, the number of operational characteristic and/or calibration parameter may be adjusted based on the identified desired, calibration parameters to improve the operation of radiometer 100 may be dependent, at least in part, on the calculated calibration uncertainty and/or radiometer gain uncertainty.

Figure 6:
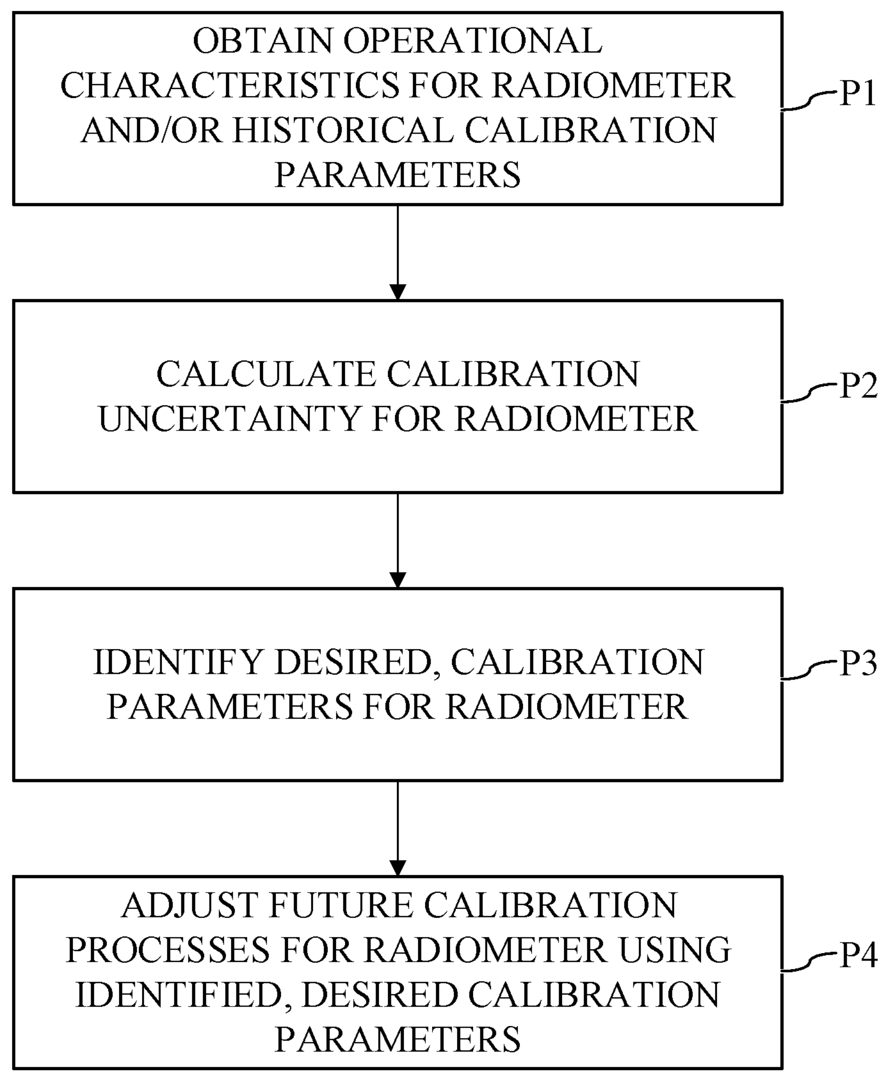
FIG. 6 shows a flowchart illustrating processes for improving the operation of radiometers, according to embodiments of the disclosure.

FIG. 6 depicts non-limiting example processes for operating radiometers. Specifically, FIG. 6 shows a flowchart depicting example processes for improving the operation of radiometers. In some cases, a computing device(s), radiometer, and/or radiometer system may be used to perform the processes for operating radiometers, as discussed herein with respect to FIGS. 1, 2, 5, and/or 7.

In process P1, data/information relating to the radiometer may be obtained. More specifically, operational characteristics for the radiometer and/or historical calibration parameters for a plurality of previously performed calibration processes using the radiometer may be obtained, received, and/or collected. The previous calibration processes performed by the radiometer may be performed before and/or after the radiometer detects the energy output (e.g., microwave energy (E)) from a measured object. In non-limiting examples, historical calibration parameters for the radiometer may include: radiometer gains determined during the performed calibration processes using the radiometer, time intervals used when previously performing the plurality of calibration processes using the radiometer, a calibration target used when previously performing the plurality of calibration processes using the radiometer, a number of calibration targets used when previously performing the plurality of calibration processes using the radiometer, and/or a reference temperature for the calibration target used when previously performing the plurality of calibration processes using the radiometer. Furthermore in non-limiting examples, the operational characteristics of the radiometer may include: an age of the radiometer, detected temperatures of an antenna of the radiometer, detected internal component temperatures of the radiometer, time intervals for detecting energy emitted by a measured object, bandwidth of the radiometer, and/or a position of the radiometer with respect to the measured object.

In process P2, a calibration uncertainty may be calculated for the radiometer. More specifically, a calibration uncertainty may be calculated for the radiometer and/or the previous calibration processes performed by the radiometer. The calibration uncertainty may be calculated using and/or may be based on the obtained operational characteristics of the radiometer and/or the obtained historical calibration parameters (e.g., process P1). In the non-limiting example, the calculating of the calibration uncertainty includes analyzing a fluctuation in radiometer gains determined during the performed calibration processes using the radiometer. That is, the radiometer gains included in the historical calibration parameters may be distinct, differ, and/or fluctuate when compared to one another under distinct operational characteristics of the radiometer (e.g., antenna temperature, radiometer position, etc.). During the calculating of the calibration uncertainty, the fluctuation of the various radiometer gains of the historical calibration, along with corresponding operational characteristics of the radiometer, may be analyzed, evaluated, and/or compared.

In process P3, desired, calibration parameters may be identified for the radiometer. That is, and based on the calculated, calibration uncertainty (e.g., process P2), desired, calibration parameters may be identified, determined, and/or perceived for the radiometer. The desired, calibration parameters may be used in future calibration processes performed by the radiometer (see, process P4). In non-limiting examples, identifying the desired, calibration parameters may include identifying a distinct calibration target used in the future calibration processes. The distinct calibration target may differ from a calibration target used when previously performing the plurality of calibration processes using the radiometer to obtain the historical calibration parameters. Additionally, or alternatively in another non-limiting example, identifying the desired, calibration parameters may include identifying distinct calibration time intervals and/or positions of the radiometer for future calibration processes. The distinct calibration time intervals and/or radiometer position(s) may differ from time intervals (e.g., less or more measurement time) and/or radiometer position(s) (e.g., position 1 is more accurate than position 3) used when previously performing the plurality of calibration processes using the radiometer to obtain the historical calibration parameters. As discussed herein, the desired, calibration parameters for the radiometer may be associated with parameters that may achieve the least amount or no uncertainty in the calibration process. This may result in the most accurate detection, determination, and/or calculation of the radiometer's gain, which ultimately will increase and/or improve the accuracy of radiometer when detecting energy from a desired object.

The identified desired, calibration parameters may also affect operational characteristics of the radiometer while performing the future calibration processes as well. That is, the identified desired, calibration parameters may correspond to desired, operational characteristics for the radiometer while performing the future calibration processes. The desired, operational characteristics may ensure at least some of the desired, calibration parameters may be met or achieved while performing the future calibration processes. Continuing the example above, identifying a distinct calibration target for future calibration processes may require the identification of corresponding operational characteristics for the radiometer (e.g., position of radiometer, bandwidth, antenna position) that may need to be adjusted during future calibration processes to achieve the identified desired, calibration parameters.

In process P4, future calibration processes for the radiometer may be adjusted. More specifically, future calibration processes for the radiometer may be adjusted using, based, and/or dependent on the identified desired, calibration parameters; and where applicable, corresponding/associated operational characteristics (e.g., process P3). The future calibration processes may be adjusted, for example, manually by a user or operator of the radiometer. In other non-limiting examples, future calibration processes may be adjusted automatically using a computing device/system that may be in electronic communication with radiometer and may receive/obtain the identified desired, calibration parameters.

Also in process P4, operational characteristics for the radiometer may be adjusted. That is, adjusting future calibration processes for the radiometer may also include adjusting operational characteristics for the radiometer using, based on, and/or dependent on the identified desired, calibration parameters (e.g., process P3). Adjusting operational characteristics corresponding to and/or associated with the identified desired, calibration parameters may ensure future calibration processes for the radiometer are achieved.

Processes P1-P4 shown in FIG. 6 may be performed a single time or may be performed more than once to constantly, or as requested, improve the operation of a radiometer. Additionally, some of the processes may be performed a plurality of times, while other may only be performed once. For example, processes P1-P3 may be performed a plurality of times to generate a plurality of desired, calibration parameters for the radio, before performing process P4. In this non-limiting example, process P3 may further include analyzing, comparing, and/or combining identified desired, calibration parameters, with previously identified desired, calibration parameters, prior to future calibration processes being adjusted by the identified desired, (combined) calibration parameters.

Figure 7:
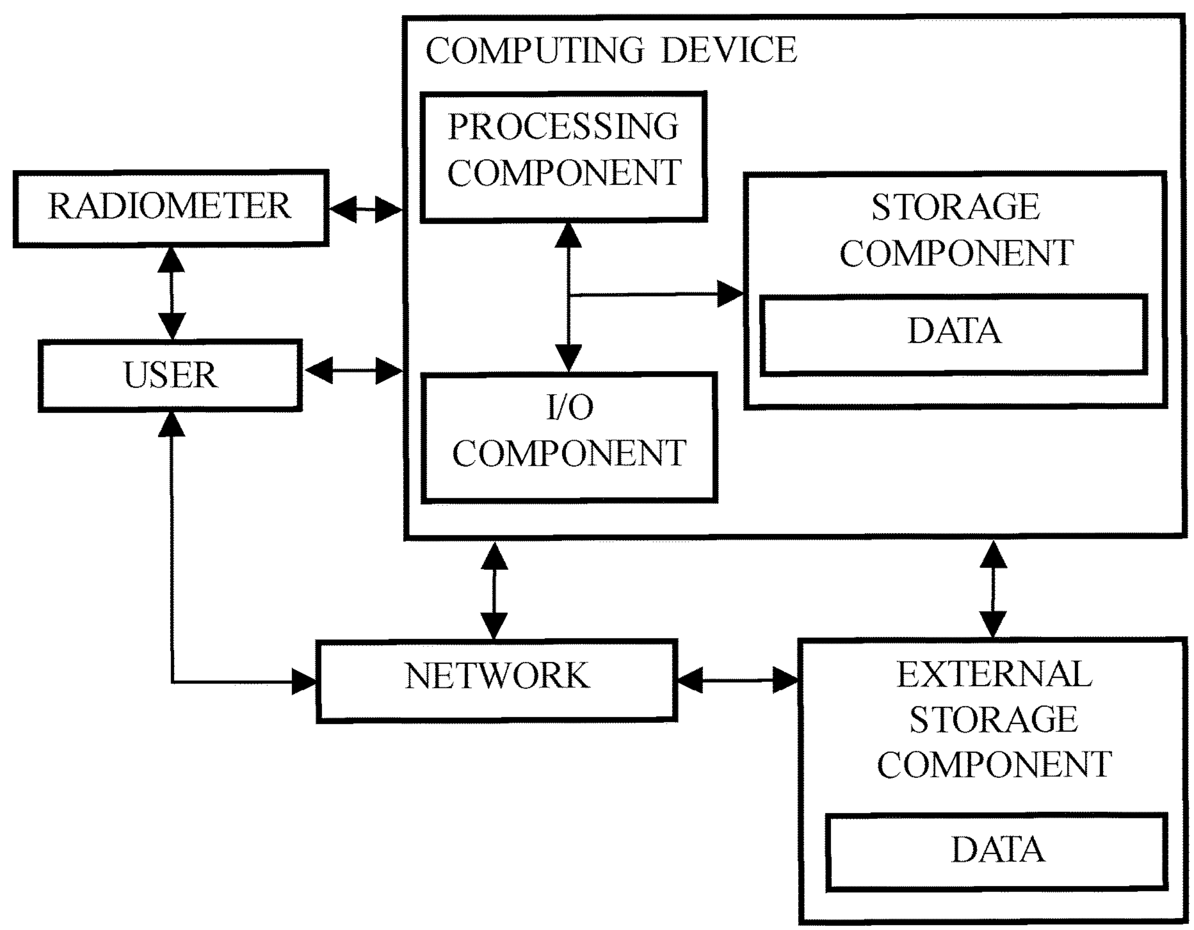
FIG. 7 shows a schematic view of a computing system configured to operate and interact with a radiometer, according to embodiments of the disclosure.

FIG. 7 depicts a schematic view of a computing environment or system (hereafter, "computing system"), and the various components included within computing system. In the non-limiting example shown in FIG. 7, computing system may include at least one computing device that may be configured to operate and/or interact with radiometer by performing the processes P1-P4 discussed herein with respect to FIG. 6. It is understood that similarly named components may function in a substantially similar fashion. Redundant explanation of these components has been omitted for clarity.

It is understood that computing device(s) may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, single-board microcontroller, programmable logic circuitry, field-programmable gate arrays (FPGA), advanced RISC machines (ARM), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Computing system shown in FIG. 7 may include any type of computing device(s) and for example includes at least one processor or processing component(s), storage component, input/output (I/O) component(s) (including a keyboard, touchscreen, or monitor display), and a communications pathway. In general, processing component(s) execute program code which is at least partially fixed or stored in storage component. While executing program code, processing component(s) can process data, which can result in reading and/or writing transformed data from/to storage component and/or I/O component(s) for further processing. The pathway provides a communications link between each of the components in computing device(s). I/O component can comprise one or more human I/O devices, which enables user to interact with computing device(s) to operate, control, and/or interact with radiometers, as discussed herein. Computing device(s) may also be implemented in a distributed manner such that different components reside in different physical locations.

Storage component may also include modules, data and/or electronic information relating to various other aspects of computing system. Specifically, operational modules, electronic information, and/or data relating to the radiometer (e.g., operational characteristics, historical calibration parameters for calibration processes, etc.). The operational modules, information, and/or data may include the required information and/or may allow computing system, and specifically computing device, to perform the processes discussed herein for operating the radiometer.

Computing system, and specifically computing device of computing system, may also be in communication with external storage component. External storage component may be configured to store various modules, data and/or electronic information relating to various other aspects of computing system, similar to storage component of computing device(s). Additionally, external storage component may be configured to share (e.g., send and receive) data and/or electronic information with computing device(s) of computing system. In the non-limiting example shown in FIG. 7, external storage component may include any or all of the operational modules and/or data shown to be stored on storage component. Additionally, external storage component may also include a secondary database that user may interact with, provide information/data to, and/or may include information/data relating to poster. In a non-limiting example, external storage component may be a cloud-based storage component or system. In other non-limiting examples, external storage component may also include and/or be in communication with a neural network to aid in computation and/or data processing as discussed herein.

In a non-limiting example shown in FIG. 7, computing device(s) may be in communication with and/or may be configured to share (e.g., send and receive) data and/or electronic information over a network. Network may represent a closed network, such as a local area network (LAN) or may include the internet. Network may also include secondary database including similar data as storage component, and/or may include or be in communication with a neural network to aid in computation and/or data processing as discussed herein.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., obtaining operational characteristics for the radiometer, obtaining historical calibration parameters for a plurality of previously performed calibration processes using the radiometer, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for improving an operation of a radiometer, the method comprising:

obtaining:

operational characteristics for the radiometer, and historical calibration parameters for a plurality of previously performed calibration processes using the radiometer;

calculating a calibration uncertainty for the radiometer based on the obtained operational characteristics for the radiometer and the obtained historical calibration parameters, wherein the calculating the calibration uncertainty includes analyzing a fluctuation in radiometer gains determined during the performed calibration processes using the radiometer; and identifying desired, calibration parameters for the radiometer based on the calculated, calibration uncertainty.

2. The method of claim 1, wherein the identifying of the desired, calibration parameters for the radiometer includes at least one of:

identifying a distinct calibration target used in a future calibration processes, the distinct calibration target differing from a calibration target used when previously performing the plurality of calibration processes using the radiometer to obtain the historical calibration parameters, or identifying distinct time intervals for the future calibration processes, the distinct time intervals differing from time intervals used when previously performing the plurality of calibration processes using the radiometer to obtain the historical calibration parameters.

3. The method of claim 1, further comprising:

adjusting future calibration processes for the radiometer using the identified desired, calibration parameters.

4. The method of claim 3, wherein the adjusting of the future calibration processes for the radiometer further includes:

adjusting operational characteristics of the radiometer based on the identified desired, calibration parameters.

5. The method of claim 1, wherein the historical calibration parameters include at least one of:

radiometer gains determined during the performed calibration processes using the radiometer, time intervals used when previously performing the plurality of calibration processes using the radiometer, a calibration target used when previously performing the plurality of calibration processes using the radiometer, a number of calibration targets used when previously performing the plurality of calibration processes using the radiometer, or a reference temperature for the calibration target used when previously performing the plurality of calibration processes using the radiometer.

6. The method of claim 1, wherein the operational characteristics of the radiometer include at least one of:

an age of the radiometer, detected temperatures of an antenna of the radiometer, detected internal component temperatures of the radiometer, time intervals for detecting energy emitted by a measured object, bandwidth of the radiometer, or a position of the radiometer with respect to the measured object.

7. A computer program product comprising program code stored on a non-transitory computer readable storage medium, which when executed by at least one computing device, causes the at least one computing device to improve an operation of a radiometer by performing processes including:

obtaining:

operational characteristics for the radiometer, and historical calibration parameters for a plurality of previously performed calibration processes using the radiometer;

calculating a calibration uncertainty for the radiometer based on the obtained operational characteristics for the radiometer and the obtained historical calibration parameters, wherein calculating the calibration uncertainty includes analyzing a fluctuation in radiometer gains determined during the performed calibration processes using the radiometer; and identifying desired, calibration parameters for the radiometer based on the calculated, calibration uncertainty.

8. The computer program product of claim 7, wherein the identifying of the desired, calibration parameters for the radiometer includes at least one of:

identifying a distinct calibration target used in a future calibration processes, the distinct calibration target differing from a calibration target used when previously performing the plurality of calibration processes using the radiometer to obtain the historical calibration parameters, or identifying distinct time intervals for the future calibration processes, the distinct time intervals differing from time intervals used when previously performing the plurality of calibration processes using the radiometer to obtain the historical calibration parameters.

9. The computer program product of claim 7, wherein the program code causes the at least one computing device to perform further processes including:

adjusting future calibration processes for the radiometer using the identified desired, calibration parameters.

10. The computer program product of claim 9, wherein the adjusting of the future calibration processes for the radiometer further includes:

adjusting operational characteristics of the radiometer based on the identified desired, calibration parameters.

11. The computer program product of claim 7, wherein the historical calibration parameters include at least one of:

radiometer gains determined during the performed calibration processes using the radiometer, time intervals used when previously performing the plurality of calibration processes using the radiometer, a calibration target used when previously performing the plurality of calibration processes using the radiometer, a number of calibration targets used when previously performing the plurality of calibration processes using the radiometer, or a reference temperature for the calibration target used when previously performing the plurality of calibration processes using the radiometer.

12. The computer program product of claim 7, wherein the operational characteristics of the radiometer include at least one of:

an age of the radiometer, detected temperatures of an antenna of the radiometer, detected internal component temperatures of the radiometer, time intervals for detecting energy emitted by a measured object, bandwidth of the radiometer, or a position of the radiometer with respect to the measured object.

13. A system comprising:

a radiometer; and at least one computing device operably coupled to the radiometer, the at least one computing device configured to improve an operation of the radiometer by performing processes including:

obtaining:

operational characteristics for the radiometer, and historical calibration parameters for a plurality of previously performed calibration processes using the radiometer;

calculating a calibration uncertainty for the radiometer based on the obtained operational characteristics for the radiometer and the obtained historical calibration parameters, wherein the calculating the calibration uncertainty further by analyzing a fluctuation in radiometer gains determined during the performed calibration processes using the radiometer; and identifying desired, calibration parameters for the radiometer based on the calculated, calibration uncertainty.

14. The system of claim 13, wherein the at least one computing device is configured to identify the desired, calibration parameters for the radiometer by at least one of:

identifying a distinct calibration target used in a future calibration processes, the distinct calibration target differing from a calibration target used when previously performing the plurality of calibration processes using the radiometer to obtain the historical calibration parameters, or identifying distinct time intervals for the future calibration processes, the distinct time intervals differing from time intervals used when previously performing the plurality of calibration processes using the radiometer to obtain the historical calibration parameters.

15. The system of claim 13, wherein the at least one computing device is configured to improve the operation of the radiometer by performing further processes including:

adjusting future calibration processes for the radiometer using the identified desired, calibration parameters.

16. The system of claim 15, wherein the at least one computing device is configured to adjust future calibration processes for the radiometer by:

adjusting operational characteristics of the radiometer based on the identified desired, calibration parameters.

17. The system of claim 13, wherein:

the historical calibration parameters include at least one of:

radiometer gains determined during the performed calibration processes using the radiometer, time intervals used when previously performing the plurality of calibration processes using the radiometer, a calibration target used when previously performing the plurality of calibration processes using the radiometer, a number of calibration targets used when previously performing the plurality of calibration processes using the radiometer, or a reference temperature for the calibration target used when previously performing the plurality of calibration processes using the radiometer; and the operational characteristics of the radiometer include at least one of:

an age of the radiometer, detected temperatures of an antenna of the radiometer, detected internal component temperatures of the radiometer, time intervals for detecting energy emitted by a measured object, bandwidth of the radiometer, or a position of the radiometer with respect to the measured object.

* * * * *